United States Patent Office 3,470,430
Patented Sept. 30, 1969

3,470,430
AIRCRAFT PITCH AXIS SERVO CONTROL INCLUDING NOISE ELIMINATION AND NONLINEAR COMPENSATION
James R. Younkin, Mineral Wells, Tex., assignor to Mitchell Industries, Inc., Mineral Wells, Tex., a corporation of Texas
Filed Mar. 11, 1966, Ser. No. 533,701
Int. Cl. G05b 11/14; H02p 7/00
U.S. Cl. 318—18                   6 Claims

ABSTRACT OF THE DISCLOSURE

The disclosure is directed to a control system for an aircraft pitch axis wherein the pitch control output of an aircraft may be utilized in conjunction with either an altitude hold function, manual pitch control, or a glide slope coupler. The selected control function is filtered and added with the output from the pitch gyro. The combined signals are filtered and passed through a phase detector to drive a servo actuator to operate the aircraft elevators. Feedback of the servo drive signal is passed through a nonlinear network and a low pass filter for insertion into the filter for the combined signals. Circuitry is provided in the filter for the selected control function to nonlinearly control the time response of the filter to provide a delayed response for all control functions exceeding a predetermined level.

---

This invention relates to the control of an aircraft, and more particularly to the automatic control of the attitude of an aircraft relative to the pitch axis.

It has been found desirable to provide a pitch control system that is adaptable to a plurality of functions. One function is to maintain level flight at a given altitude thereby to relieve the pilot of constant effort to compensate for turbulence. The pilot may wish to direct a command attitude other than horizontal flight through the use of a pitch control system. Further, the system may be made responsive to a glide slope coupler, automatically to control an approach.

It has been found that the different responses of a pitch control system to different conditions under different modes of operation are highly desirable. The present invention is directed to a pitch control system which automatically will limit any change in attitude to a predetermined deviation rate, which is adaptable to be coupled to an altitude sensing unit or to a glide slope coupler and, in response to the same, provides for fast reaction to small signals, and, further, is responsive to changes due to turbulence to maintain substantially level flight when desired.

In accordance with the invention, pitch axis control is provided where a servo actuator coupled to elevators is to be responsive to pitch signals from a gyro and from pitch command units. An excitation source is provided for synchronizing the gyro and the command units and the circuitry for actuating the servo actuator in response to the signals from the command unit. A first synchronous filter is connected to the excitation source and is responsive to signals from the command units for producing an output signal. A second synchronous filter is connected to receive output signals from the first synchronous filter. A synchronous detector and an amplifier system serve to interconnect the second synchronous filter and the actuator. A feedback loop is provided with nonlinear and delay elements for applying a delayed representation of the drive voltage on the actuator to the input of the second synchronous filter.

In a further aspect, a gyro signal representative of variations in pitch and synchronized with the synchronous filters is added to the output signal from the first synchronous filter to provide for rapid correction of pitch variations represented by the gyro signal. In a further aspect, the first synchronous filter is provided with an input circuit that rapidly follows command signals of low level and provides for slow response to command signals exceeding a predetermined minimum level.

For a more complete understanding of the present invention and for further objects and advantages thereof, reference may now be had to the following description taken in conjunction with the accompanying drawings in which.

Figure 1:
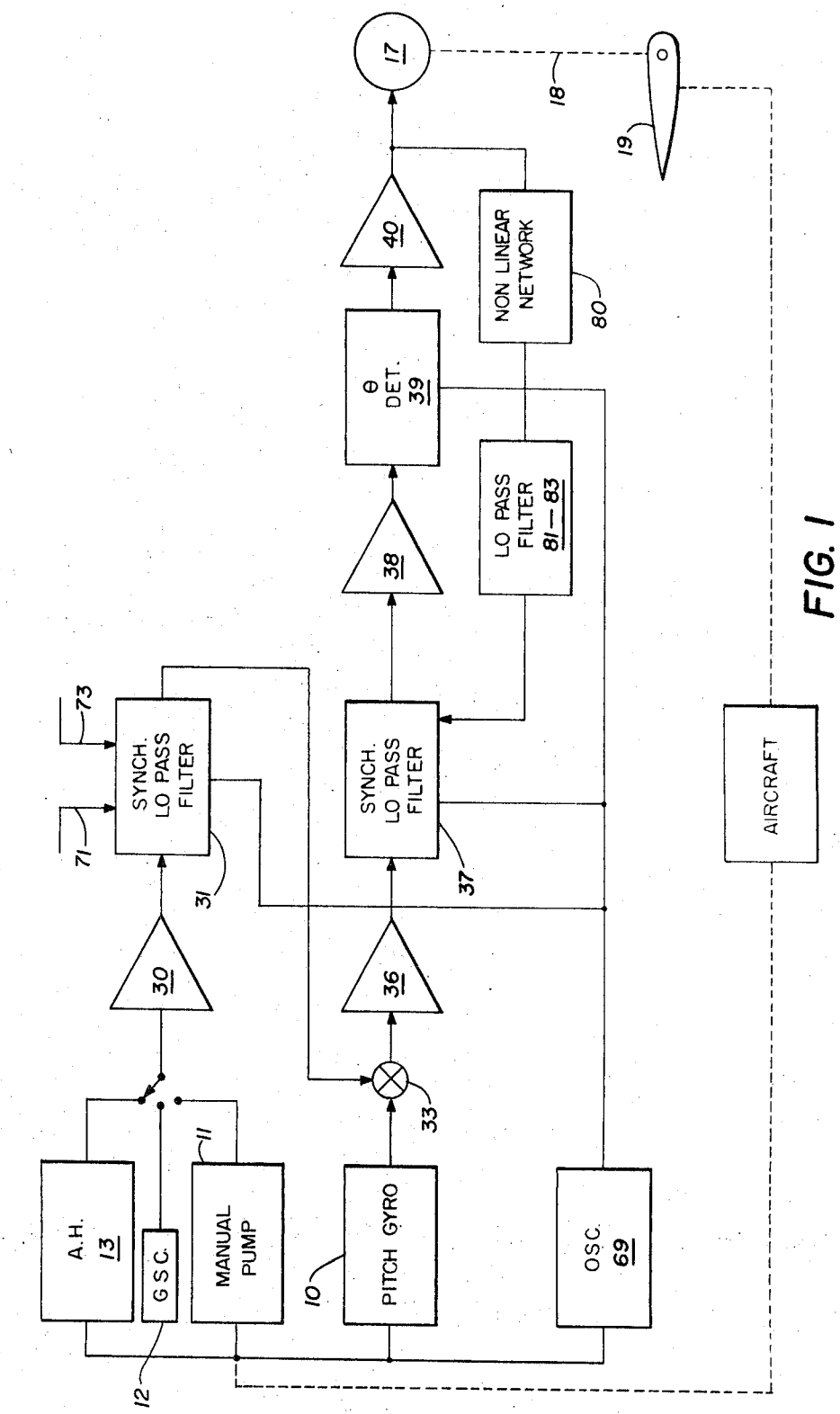
FIGURE 1 illustrates a block diagram of the system according to the present invention.
Figure 2:
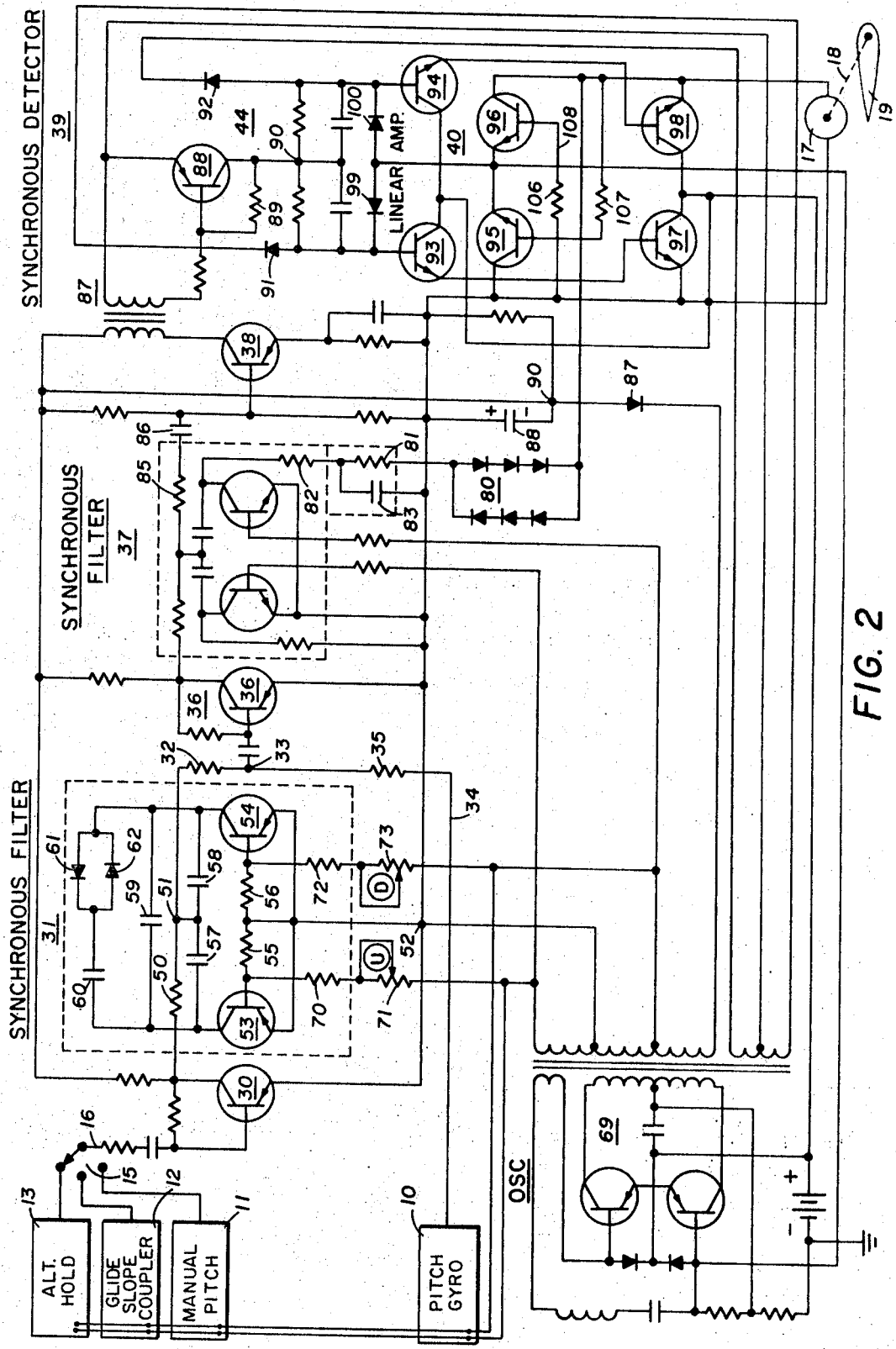
FIGURE 2 illustrates a circuit diagram of a pitch axis control system embodying the present invention.

Referring now to FIGURES 1 and 2, there is illustrated a pitch axis control system which is responsive to a signal from a pitch axis displacement type gyro 10, to a manual control 11, to the output of a glide slope coupler 12, and to an altitude hold unit 13. As is well known, the pitch signal may be conveniently derived from a pick-off on a vertical gyro normally employed for use in an artificial horizon. An output signal from the pitch command unit 11, the coupler 12, or from the hold unit 13 is selected by a switch 15. The signal selected by switch 15 is applied by way of channel 16 to a first input to a signal channel leading to a pitch axis servo actuator 17 coupled by linkage 18 to elevators 19.

The signal channel includes a first stage which is an amplifier 30. The output of amplifier 30 is applied to a synchronous filter 31. The output of filter 31 is applied by way of adding resistor 32 to a summation point 33. The pitch signal is applied by way of conductor 34 and resistor 35 to the summation point 33. The signal from point 33 is applied to an amplifier 36 whose output is applied to a second synchronous filter 37. The output of filter 37 is applied by way of a saturable amplifier 38 to a synchronous detector 39, whose output in turn is applied to a linear amplifier 40 for control of the servo actuator 17.

The present invention is particularly concerned with the provision of structures such that the system will exhibit different repsonses to different kinds of input signals. More particularly, the system provides for fast reaction to small signals as may be derived from the altitude hold unit 13 or the glide slope coupler 12, such that immediate or rapid compensation will be provided for unwanted deviations from a selected attitude. The system also provides for relatively slow response to large command signals or extremely large changes in attitude thereby to prevent introduction of an excessive maneuver command. Further, the system is made to have fast reaction to minute pitch signals. The flight thus controlled relative to the pitch axis may be optimized by the present invention.

Filter 31

The signals from the manual pitch command 11, glide slope coupler 12, or the altitude hold unit 13 to amplifier 30 are applied by way of an input resistor 50 to the synchronous filter 31. The filter 31 will be recognized as having output terminals 51 and 52.

Two circuits including transistors 53 and 54 are connected across the terminals 51 and 52. More particularly, the common emitter circuit for transistors 53 and 54 is connected directly to terminal 52 and to juncture between series connected base resistors 55 and 56. The collector of transistor 53 is connected to the collector of transistor 54 by way of two series connected condensers 57 and 58. The midpoint between condensers 57 and 58 is connected to output terminal 51. A condenser 59 is connected in parallel with the condensers 57 and 58. Similarly, a condenser 60 is connected in series with a pair of oppositely poled diodes 61 and 62. This series circuit is connected directly between the collectors of transistors 53 and 54.

Square waves are applied out-of-phase to the bases of transistors 53 and 54 to turn them on alternately. More particularly, the base of transistor 53 is connected by way of resistor 70 and adjustable potentiometer 71 to the output from a square wave oscillator 69. The base of transistor 54 is connected by way of resistor 72 and adjustable potentiometer 73 to the other output terminal of oscillator 69. The potentiometer 71 provides for adjusting the response of the system to up pitch commands or other signals. The potentiometer 73 provides for independent adjustment of the response of the system to down pitch commands or signals. The oscillator 69 is also connected to the pitch gyro 10, the manual pitch command unit 11, the glide slope coupler 12, and the altitude hold unit 13 so that the input signals to the circuit 31 are synchronized with the signals applied to the bases of transistors 53 and 54. The condensers 57 and 58 are relatively small, in one example being 1.0 microfarad each. In contrast, the condenser 60 was 200 microfarads. This condenser serves to prevent the output of the synchronous filter from following rapidly changes in the input signal. However, the presence of the diodes 61 and 62 prevents imposition of a delay action on the condenser 60 for small signals. In the case of small signals, less than the drop across each diode, the system's response is rapid. More particularly, the voltage drop across diodes 61 and 62 is of the order of about 0.6 volt. Any signal applied to the circuit less than this value will not be effective upon condenser 60. However, voltages in excess of the drop across diodes 61 and 62 will then build up on condenser 60 so that, depending upon the changing time constant, the voltage will appear on the output circuit with a selected delay. The use of the time delay circuit provided by capacitor 60 in filter 31 indirectly limits the pitch rotation rate by limiting the rate at which a command is applied.

Thus, for small signals applied to the synchronous filter 31 of less than half a volt, the output signal will promptly appear at the output terminal 33. For larger signals, the circuit 31 introduces a substantial time delay. This means that the output signal at point 33 from the synchronous filter 31 will follow rapidly the small command signals as derived from altitude hold unit or glide slope coupler but will delay the reaction to larger signals as may be produced by manual control or as may be introduced from the altitude hold unit in extreme turbulence.

Filter 37

The signal from the filter 31 is applied by way of amplifier 36 to the input to a second synchronous filter 37. The filter 37 is constructed basically the same as the filter 31 except it does not operate with non-linear delay, lacking elements corresponding with condenser 59, condenser 60 and diodes 61 and 62. The synchronous filter 37 serves to eliminate any unwanted signals present by reason of pick-up in the circuits leading to the summation point 33 and further, permits the addition at point 33 of alternating current signals which may then be transmited to the synchronous detector 39. The filter 37 further provides for the introduction and addition to the signal from point 33 of a feedback signal which is applied by way of a non-linear network 80 and a delay circuit comprised of resistors 81 and 82 and condenser 83. The feedback signal is chopped in the synchronous filter 37 as it is added to the signal from point 33 and serves to match the input signal to the characteristics of the servo actuator 17 and its effect on the attitude of the aircraft. The output signal from the synchronous filter 37 is applied by way of resistor 85 and condenser 86 to the input to saturable amplifier 38 whose output is coupled by way of transformer 87 to the input of the synchronous detector 39.

Synchronous detector 39

The signal from transformer 87 is applied to transistor 88. The transformer 87 provides for D.C. isolation of the phase detector 39. The amplifier 38 provides an increase both in gain and power of the signal which drives the phase detector. A resistor 89 provides a forward bias on transistor 88 so that the transistor 88 will conduct when there is no signal present.

The phase detector 39 thus provides the input error signal which is applied to the terminal 90. Reference signals, derived from oscillator 69 are applied to the phase detector by way of diodes 91 and 92. The reference signals are applied to the bases of transistors 93 and 94 which are the driver transistors for the power amplifier 40.

Power amplifier 40 includes transistors 95, 96, 97, and 98. The common emitter terminal on transistors 95 and 96 is connected to the ground bus 52 and to the common juncture between diodes 99 and 100 which lead to the bases of transistors 93 and 94, respectively. The common collector terminal of transistors 93 and 94 is connected by way of conductor 105 to the common collector terminal of transistors 97 and 98, and, to the B+ terminal of a supply source.

The emitter of transistor 93 is connected to the base of transistor 97 and the emitter of transistor 94 is connected to the base of transistor 98. The base of transistor 95 is connected to the base of transistor 96 by way of resistor 106 and, by way of resistor 107, to the emitter of transistor 98. The emitter of transistor 98 is connected to the servo 17. By this means, the amplifier output signal appearing on conductor 108 is applied to the servo 17.

In accordance with the present invention, a feedback signal is applied by way of conductor 108, nonlinear network 80, and a filter comprising resistors 81 and 82 and condenser 83 to the input of synchronous filter 37. The nonlinear network comprised of one or more pairs of oppositely poled diodes serves to compensate for the voltage necessary to overcome static friction in the servo actuator 17. Thus, there will be no voltage in the feedback circuit until the output signal applied to the actuator 17 is of a level equal to the motor threshold voltage. In the system described, the nonlinear network 80 includes six diodes, three connected effectively in series in each direction so that no feedback signal is introduced into the synchronous filter 37 until the power amplifier output voltage is adequate to begin to move actuator 17.

The time constant of the feedback filter 81–83 is controlled as to form a lag network. The feedback loop including the filter 81–83 extends around and includes the saturable amplifier 40. In this case, the servo actuator runs at full speed until the feedback loop supplies a cancellation signal, thus effectively permitting change in the transfer function of the system. This would not be the case if the amplifier channel were linear. However, with a saturable amplifier, the feedback loop serves to match the signal in the driving amplifier to the servo 17. The characteristics of the unbalance signal are thus matched to the servo so that movmeent of the control surface 19 will be properly controlled without the necessity of a follow-up element coupled thereto. Below the signal level at which the signal channel is saturated, the amplifier 40 in its linear operation will cause the servo actuator to run at variable speed. For a more detailed description of the theory of operation of the present feedback system, reference is made to copending patent application Ser. No. 533,708, filed Mar. 11, 1966.

It will be appreciated that static friction in the servo actuator 17 can be compensated other than by the nonlinear network 80. More particularly, synchronous filter 37 may utilize a signal from a low frequency dither oscillator to effectively keep the actuator 17 constantly moving, thereby avoiding static friction. Such a dither oscillator may be added to the circuit in place of the nonlinear network 80. Dither oscillator output signals of opposite phase may be added to the signal applied to the two transistors of filter 37.

In operation of the system shown in FIGURES 1 and 2, the oscillator 69 applies square wave voltage to the synchronous filter 31 via resistors 71 and 73. A square wave voltage is also applied from the oscillator 69 to the pitch gyro 10, the manual pitch 11, the glide slope coupler 12 and the altitude hold 13. The input signal from the selected one of the manual pitch 11, glide slope coupler 12 or altitude hold 13 is fed through the switch 15 to the amplifier transistor 30 and to the input of the synchronous filter 31. When a signal is presented to the input of the filter 31, during one-half cycle of the square wave voltage the net effect of the signal will be averaged and stored on capacitor 57. During the other half of the square wave voltage cycle the net effect of the input signal is averaged and stored on capacitor 49. A modulated square wave output voltage is thus produced at the output of the filter 31 and applied to the resistor 32.

The filter 31 serves to eliminate unwanted signal or noise components in the input signal, and the in or out of phase (0° or 180°) components of the signal are translated into a sharp square wave output signal which is synchronized with the output of the oscillator 69. The capacitor 60 serves to prevent a rapid response of the circuit to large changes in the input signal. The transistors 52 and 54 act as open switches when their respective bases are more positive than their collectors, and as closed switches regardless of collector polarity when adequate negative drive is applied to the base of the transistors. The output of the synchronous filter 31 is summed at point 33 with the A.C. output of the pitch gyro 10 to amplify transistor 36. The filter 31 permits the summation of the A.C. singles at the summation point 33 in a simplified manner without attendant difficulties which occur in other procedures. Filter 31 may also be utilized to limit the input signals if desired according to the setting of the potentiometers 71 and 73.

The summed square wave output signal from the filter 31 and the output from the pitch gyro 10 are applied by way of amplifying transistor 36 to the input of a second synchronous filter 37. The input coupling the filter 37 provides rapid response rather than a delay as built into filter 31 by the condensor 60. The filter 37 filters out unwanted components from the summed signal. The synchronous filter 37 provides chopping of the feedback signal from the low pass filter 81–83 as the feedback signal is fed into the filter 37, and filter 37 also serves to match the input signals to the characteristics of the servo actuator 17.

The square wave output signal from the synchronous filter 37 is applied through the capacitor 86 to the amplifier 38 and applied by way of transformer 62 to the synchronous detector 39. Detector 39 provides a D.C. output signal having an amplitude and polarity responsive to the A.C. input signals. This D.C. signal is amplified to drive the servo actuator 14. Reference signals are derived from the oscillator 69 and applied to the phase detector by way of diodes 91 and 92. The phase detector 39 thus compares the input signal against the reference signals and generates an input error signal which is applied to terminal 90. The amplifier 40 comprises driver transistors 93 and 94 which drive the power amplifier comprising transistors 95, 96, 97, and 98. Amplifier 40 operates upon the error signal provided by the phase detector 39 and generates a feedback output. This feedback output is applied through the nonlinear network 80 and through the filter comprising resistors 81 and 82 and capacitor 83 to the filter 37. The output from the amplifier 40 is also utilized to drive the servo actuator 17. No feedback signal is introduced into the synchronous filter 37 until the amplifier 40 output voltage is adequate to being to move the actuator 17. The servo actuator 17 operates to run at full speed until the feedback loop supplies a cancellation signal. Below the signal level at which the amplifier 40 is saturated, the servo actuator 17 will be run at a variable speed. As previously described, this system serves to eliminate the requirement of a followup system as the feedback signal is matched to the servo drive signal thereby cancelling out the error signal for a given command signal.

In an embodiment of the present invention as shown in FIGURE 1, the following parameters were employed:

| | |
|---|---|
| Oscillator 60 | c.p.s.__ 5000 |
| Transistors 53, 54 | MA900 |
| 93, 94 | 2N3116 |
| 91, 92 | 2N1194 |
| 95–98 | 2N3005 |
| 30, 36, 38 | MPS6515 |
| Resistors 55, 56 | 2.7K |
| 50, 70, 72 | 4.7K |
| 35 | 10K |
| 71, 73 | 20K |
| 32 | 47K |
| Condensers 57, 58 | microfarad__ 1 |
| 59 | do___ 5 |
| 60 | do___ 200 |
| 222 | do___ 500 |
| Resistors | |
| 82 | 3.3K |
| 81 | 4.7K |
| Diodes 61, 62, 80 | IN4001 |

Having described the invention in connection with certain specific embodiments thereof, it is to be understood that further modifications may now suggest themselves to those skilled in the art and it is intended to cover such modifications as fall within the scope of the appended claims.

What is claimed is:

1. In an autopilot system for pitch axis control wherein a servo actuator is coupled to elevators and is to be responsive to pitch signals from a pitch control unit, the combination which comprises:
    (a) an excitation means for said control unit,
    (b) a first synchronous filter connected to said excitation means and responsive to said control unit for producing an output signal,
    (c) a circuit including a second synchronous filter and a synchronous detector connected to said excitation means and to said first synchronous filter for applying said output signals from said filter as a drive voltage to said actuator,
    (d) circuit means for nonlinearly applying a delayed representation of the drive on said actuator to the input of said second synchronous filter, and
    (e) control circuit means in said first synchronous filter for nonlinearly controlling the time response thereof for delayed response to all command signals exceeding a predetermined level.

2. The combination set forth in claim 1 wherein said control circuit means comprises a storage capacitor connected in series wtih a pair of oppositely poled parallel diodes, with the resulting series circuit being connected across the input to said first synchronous filter.

3. The combination set forth in claim 1 in which a pair of small coupling condensers in the input of said first synchronous filter are connected in parallel with a series circuit consisting of a large condenser and two paralleled oppositely poled diodes.

4. The combination set forth in claim 1 in which two input circuits are provided in said first synchronous filter, one with a short time constant and the other being nonlinear with a long time constant, for delaying the output of said first synchronous filter in response to input signals above a predetermined level.

5. In an autopilot system for pitch axis control wherein a servo actuator is coupled to elevators and is to be responsive to pitch signals from pitch control units, the combination which comprises:
  (a) an excitation means for said control units,
  (b) a first synchronous filter connected to said excitation means and responsive to said control units for producing an output signal,
  (c) a second synchronous filter connected to said excitation means and coupled to receive said output signal from said first synchronous filter,
  (d) a synchronous detector connected to said excitation means and to a power amplifier for interconnecting said second synchronous filter and said actuator,
  (e) circuit means for nonlinearly applying a delayed representation of the drive on said actuator to the input of said second synchronous filter, and
  (f) circuit means in said first synchronous filter for nonlinearly controlling the time response thereof for delayed response to all command signals exceeding a predetermined level.

6. In an autopilot system for pitch axis control wherein a servo actuator is coupled to elevators and is to be responsive to pitch signals from pitch control units, the combination which comprises:
  (a) an excitation means for said control units,
  (b) a first synchronous filter connected to said excitation means and responsive to said control units for producing an output signal,
  (c) a second synchronous filter connected to said excitation means and coupled to receive said output signal from said first synchronous filter,
  (d) a circuit including a saturable amplifier, a synchronous detector connected to said excitation means and to a power amplifier for interconnecting said second synchronous filter and said actuator, and
  (e) circuit means for nonlinearly applying a delayed representation of the drive on said actuator to the input of said second synchronous filter.

References Cited
UNITED STATES PATENTS

| | | |
|---|---|---|
| 2,632,872 | 3/1953 | Warsher. |
| 2,881,379 | 4/1959 | Logan. |
| 2,954,514 | 9/1960 | Hemstreet. |
| 3,201,675 | 8/1965 | Curran et al. |
| 3,246,221 | 4/1966 | Rabier. |

ORIS L. RADER, Primary Examiner

T. E. LYNCH, Assistant Examiner

U.S. Cl. X.R.

318—28, 448, 489